US012492580B2

(12) United States Patent
Heinemann et al.

(10) Patent No.: US 12,492,580 B2
(45) Date of Patent: Dec. 9, 2025

(54) BOLT LOCK

(71) Applicant: ABUS August Bremicker Söhne KG, Wetter-Volmarstein (DE)

(72) Inventors: Stefan Heinemann, Wetter (DE); Wolfgang Tobias Breddermann, Oberhausen (DE); Fabienne Beul, Rennerod (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 58 days.

(21) Appl. No.: 18/744,842

(22) Filed: Jun. 17, 2024

(65) Prior Publication Data

US 2024/0426141 A1 Dec. 26, 2024

(30) Foreign Application Priority Data

Jun. 20, 2023 (DE) ......................... 102023116135.0

(51) Int. Cl.
*E05B 67/24* (2006.01)
*E05B 71/00* (2006.01)

(52) U.S. Cl.
CPC .............. *E05B 67/24* (2013.01); *E05B 71/00* (2013.01)

(58) Field of Classification Search
CPC ...... E05B 67/003; E05B 67/063; E05B 67/22; E05B 67/24; E05B 71/00
See application file for complete search history.

(56) References Cited

U.S. PATENT DOCUMENTS 3,728,879 A * 4/1973 Best ...................... E05B 67/003 70/369
3,765,196 A * 10/1973 Balicki ................. E05B 67/003 70/49
3,785,182 A * 1/1974 Van Lahr ................ E05B 67/24 70/369

(Continued)

FOREIGN PATENT DOCUMENTS

DE 19638188 A1 3/1998
DE 10228039 A1 3/2003

(Continued)

*Primary Examiner* — Christopher J Boswell
(74) *Attorney, Agent, or Firm* — Dickinson Wright PLLC

(57) ABSTRACT

A bolt lock comprises a lock body and a bolt which can be selectively inserted into the lock body and locked to the lock body. The lock body comprises a lock cylinder which can be actuated between an initial position and an actuating position by means of an associated key; a latch which is movable between a locking position and an unlocked position; and a blocker which is movable between a blocking position and a release position. The latch locks the inserted bolt to the lock body in the locking position and releases the inserted bolt for removal from the lock body in the unlocked position. By actuating the lock cylinder into the actuating position, the latch can be moved to the unlocked position. The key is only removable from the lock cylinder in the initial position of the lock cylinder. The blocker blocks the lock cylinder against an actuating movement into the initial position in the blocking position, and releases the lock cylinder for an actuating movement into the initial position in the release position. The bolt inserted into the lock body moves the blocker into the release position.

17 Claims, 5 Drawing Sheets

(56) References Cited

U.S. PATENT DOCUMENTS

| | | | | | |
|---|---|---|---|---|---|
| 3,855,824 | A | | 12/1974 | Falk | |
| 3,990,275 | A | * | 11/1976 | Lippisch | E05B 37/10<br>70/322 |
| 4,063,435 | A | * | 12/1977 | Oliver | E05B 67/24<br>70/52 |
| 5,829,280 | A | * | 11/1998 | Chen | E05B 67/003<br>70/386 |
| 9,464,462 | B1 | * | 10/2016 | Liu | E05B 67/02 |
| 11,447,976 | B2 | * | 9/2022 | Pankratius | E05B 71/00 |
| 12,241,283 | B2 | * | 3/2025 | Kaiser | E05B 27/00 |
| 2010/0319414 | A1 | * | 12/2010 | Schaefer | E05B 67/24<br>70/52 |

FOREIGN PATENT DOCUMENTS

| | | | |
|---|---|---|---|
| DE | 112005000088 | B4 | 11/2008 |
| DE | 102015117253 | A1 | 4/2017 |
| DE | 102021118959 | A1 | 1/2023 |

* cited by examiner

BOLT LOCK

CROSS-REFERENCE TO RELATED APPLICATION

This application claims the benefit and priority of German Patent Application No. 102023116135.0 filed on Jun. 20, 2023. The entire disclosure of the above application is incorporated herein by reference.

FIELD OF THE INVENTION

The invention relates to a bolt lock having a lock body and a bolt that can be selectively inserted into the lock body and locked to the lock body. The bolt lock may be configured in particular as a two-wheeler frame lock.

BACKGROUND OF THE INVENTION

Such a bolt lock may be used to selectively secure a first object and a second object to one another. For this purpose, the lock body may be permanently mounted to the first object. The bolt may be associated with the second object, whereby the bolt, for example, may be connected to a chain or a wire rope (metal cable, in particular steel cable) which is or can be connected to the second object. For example, one object (first or second) may be a stationary anchorage (e.g. building wall, bicycle stand or lamp-post), while the other object (second or first) is a two-wheeler (e.g. bicycle or electric bicycle) which is to be selectively secured.

If the bolt lock is configured as a frame lock of a two-wheeler or for a two-wheeler, the bolt lock may comprise a shackle (in particular a linear shackle), which in a closed state is configured to pass through a spoked wheel of the two-wheeler in order to thus secure the two-wheeler against any unauthorized driving-off, wherein a free end of the shackle comprises said bolt. On the other hand, in an open state the shackle may be retracted from a space where the spoked wheel rotates for riding the two-wheeler, in order to release the two-wheeler for riding. Such a frame lock may, for example, be mounted to a frame of the two-wheeler or be integrated into a frame of the two-wheeler. In the present context, “two-wheelers” are to be understood as vehicles with at least two wheels, i.e. also cargo bikes with three wheels, for example. The bicycle may be muscle-powered, motor-powered or motor-assisted, in particular by an electric motor.

In order for such a bolt lock to reliably fulfill its securing function, it is important that the authorized user operates the bolt lock properly, in particular locks it.

SUMMARY OF THE INVENTION

It is an object of the present invention to provide a bolt lock of the aforementioned type which supports proper use by the authorized user.

This object is achieved by a bolt lock having the features of claim 1.

The bolt lock comprises a lock body and a bolt that can be selectively inserted into the lock body and locked to the lock body in the inserted state. The lock body comprises a lock cylinder that can be actuated between an initial position and an actuating position by a rotary actuation about a lock cylinder axis using an associated key. The lock cylinder may have movable tumblers that can be sorted by means of the associated key based on its coding. The lock cylinder may be configured as a disk cylinder with rotatable disk tumblers, as a plate cylinder with linear adjustable plate-shaped tumblers, or as a pin cylinder with pin tumblers, for example. The lock cylinder may, for example, have a cylinder housing and a cylinder core which is rotatable relative to the cylinder housing within the cylinder housing and has an introduction passage for introducing the associated key.

The lock body also comprises a latch that is movable between a locking position and an unlocked position, and a blocker that is movable between a blocking position and a release position. The lock cylinder, the latch and the blocker may, for example, be held or supported in a common housing of the lock body.

The latch of the lock body locks the inserted bolt to the lock body in its locking position. In the unlocked position, the latch releases the inserted bolt for removal from the lock body. By actuating the lock cylinder into the actuating position using the associated key, the latch is moved into the unlocked position and in particular may also maintain the unlocked position as long as the lock cylinder assumes the actuating position.

Only in the initial position of the lock cylinder may the key be removed from the lock cylinder. The initial position of the lock cylinder may also be referred to as the zero position. On the other hand, in the actuating position of the lock cylinder, i.e. when the latch is moved to its unlocked position, the key is secured in the lock cylinder and may not be removed from the lock cylinder. In particular, it may also be provided for, that the key is captured in the lock cylinder in intermediate positions which lie between the initial position and the actuating position of the lock cylinder, so that only in the initial position it is possible to remove the key out of the lock cylinder.

Such a securing of the inserted key in the lock cylinder may be effected in particular by the movable tumblers of the lock cylinder. For example, the tumblers (in particular, disk tumblers or plate tumblers) may have a respective introduction opening for the key, whereby the tumblers are adjusted by the insertion of the key into the lock cylinder and/or by turning the inserted key and hereby form stops against which the coding features of the key (e.g. elevation, outline of the respective introduction opening) abut directly or indirectly and which thus prevent the key from being pulled out of the lock cylinder until the lock cylinder is returned to the initial position. Alternatively or additionally, it is possible that the tumblers (in particular, pin tumblers) engage in coding recesses (for example, notches or hollows) of the key and may not move back out of the coding recesses as long as the lock cylinder is not returned to the initial position (for example, when core holes and housing holes for the pin tumblers are aligned). The inserted key may also be secured in the lock cylinder by a securing element for example, that engages in a form-fit around the tip of the key and thus prevents the key from being pulled out of the lock cylinder as long as the key is not in a zero position corresponding to the initial position of the lock cylinder.

In its blocking position, the blocker of the lock body blocks the lock cylinder from an actuating movement into its initial position. In this way, the blocker prevents the key from being removed from the lock cylinder. On the other hand, in its release position, the blocker releases the lock cylinder for an actuating movement to the initial position, so that the lock cylinder may be actuated to the initial position using the associated key and the key may be removed again from the lock cylinder. The blocker and the bolt are configured so that the bolt—when the bolt is inserted into the lock body—moves the blocker into the release position and, in particular, also holds the blocker in the release position as long as the bolt is inserted in the lock body.

The combination of a latch and a blocker, each of which interacts with the bolt inserted in the lock body, forms together with the lock cylinder an automatic key securing function. The authorized user (i.e. the owner of the associated key) may therefore only remove the key from the lock cylinder when the bolt is inserted in the lock body, whereby the blocker is moved into the release position. On the other hand, the key may not be removed after an unlocking actuation and after removing the bolt, since in this state the blocker prevents an actuating of the lock cylinder into the initial position. Instead, the user is forced to reinsert the bolt in the lock body in order to move the blocker into the release position, whereupon the lock cylinder may be actuated to the initial position (corresponding to the locking position of the latch). Therefore, the user may not easily forget to properly lock the bolt to the lock body, since otherwise he may not be able to remove the key and take it with him.

Further embodiments of the invention are explained below.

In some embodiments, the lock cylinder can be actuated between the initial position and the actuating position without spring support, for example without a torsion spring, which would preload the lock cylinder into one position or the other. Instead, it may be provided for, that the lock cylinder must be actively actuated in both directions by means of the associated key.

In some embodiments, the latch assumes the locking position when the lock cylinder is in the initial position. The bolt inserted into the lock body is thereby reliably locked when the lock cylinder assumes the initial position and the key may thus be removed. Consequently, it is ensured that the bolt is locked to the lock body when the key is removed from the lock cylinder.

In some embodiments, the latch may be pretensioned in the direction of the locking position. As a result, automatic locking may be realized. This means that the bolt is automatically locked to the lock body as a result of it being inserted in the lock body, whereby the latch is temporarily pushed back from the bolt against its pretension and then comes into locking engagement with the bolt. Subsequently, the lock cylinder may be actuated to its initial position and the key may be removed from the lock cylinder. Suitable drive slopes may be formed on the latch and/or on the bolt to drive the latch against the pretension due to the bolt.

In some embodiments, the blocker assumes the blocking position when the bolt is removed from the lock body. As a result, the lock cylinder may be prevented from being actuated to its initial position even though the bolt is not inserted in the lock body.

In some embodiments, the blocker may be pretensioned in the direction of the blocking position. As a result, it is possible to achieve a particularly reliable operation of the bolt lock since the blocker thus generally prevents the lock cylinder from being actuated to its initial position, insofar as the blocker is not actively moved against its pretension into its release position. In particular, the blocker may be driven to move to the release position by the bolt, namely by inserting the bolt in the lock body. For this purpose, suitable drive slopes may be formed on the blocker and/or on the bolt.

In some embodiments, the latch and the blocker may be floatingly mounted and pretensioned by a common preload spring. In particular, the latch and the blocker may be pretensioned in opposite directions. In particular, hereby the latch may be pretensioned in the direction of the locking position and at the same time, the blocker may be pretensioned in the direction of the blocking position, whereby a single pretensioning device is required (e.g. a compression spring).

In some embodiments, the lock cylinder may comprise a rotatable cam. The cam may be rotated by actuating the lock cylinder between the initial position and the actuating position. The cam may, for example, be directly coupled to a rotatable cylinder core of the lock cylinder (for example, as one piece). The cam may be configured to transmit a drive movement generated by the associated key to the latch. The cam may perform a movement along a circular path around the lock cylinder axis.

In some embodiments, the cam of the lock cylinder may comprise a drive section which, when the lock cylinder is actuated to the actuating position, drives the latch in the direction of its unlocked position.

Alternatively or additionally, the cam may comprise a stop section which abuts the blocker when the blocker occupies the blocking position and the lock cylinder is being actuated from the actuating position towards the initial position. In other words, when the user tries to bring the lock cylinder into the initial position by a rotary actuation using the associated key, a stop section of the lock cylinder abuts the blocker in its blocking position, which prevents the lock cylinder from reaching the initial position.

In some embodiments, the blocker may comprise a blocking section and a release section, wherein in the blocking position of the blocker, the blocking section blocks the cam of the lock cylinder against an actuating movement of the lock cylinder into the initial position, and wherein in the release position of the blocker, the release section releases the cam of the lock cylinder for an actuating movement of the lock cylinder into the initial position. The release section of the blocker may in particular be set back relative to the blocking section with respect to the direction of movement of the cam.

In some embodiments, the bolt may be inserted in the lock body along a bolt insertion direction (in particular in a straight line), wherein the key can be inserted into the lock cylinder along the lock cylinder axis, and wherein the lock cylinder axis is oriented perpendicular to the bolt insertion direction. Hence, the lock cylinder may be actuated by the user using the associated key outwith the movement path of the bolt. As a result, an undisturbed operation of the lock cylinder is possible. Furthermore, a simple and efficient driving of the latch and/or the blocker is possible by a rotary actuation of the lock cylinder, in particular via the aforementioned cam of the lock cylinder.

In some embodiments, the latch and the blocker may be mounted to be movable rectilinearly, i.e. in a straight line.

In some embodiments, the latch may comprise a flat bearing section extending along a plane perpendicular to the lock cylinder axis and being movable perpendicular to the lock cylinder axis, wherein the blocker also comprises a flat bearing section extending along a plane perpendicular to the lock cylinder axis and being movable perpendicular to the lock cylinder axis and parallel to the latch. In particular, the bearing section of the latch and the bearing section of the blocker may abut against each other to form a mutual linear guide. As a result, it is possible to have a particularly simple and small-volume mounting of the latch in the blocker. In particular, the latch and the blocker may be mounted at an underside of the lock body and/or the lock cylinder, resulting in a particularly flat structure of the lock body.

In some embodiments, the latch and the blocker may be configured as stamped and folded metal sheets.

In some embodiments, the latch may comprise a locking section that protrudes transversely, in particular perpendicularly, from the bearing section of the latch. The locking section of the latch may be configured to engage with an engaging recess of the bolt (in particular, the aforementioned engaging recess) when the latch is in the locking position.

In some embodiments, the blocker may comprise a drive section which protrudes transversely, in particular perpendicularly, from the bearing section of the blocker. A drive slope may be formed at the drive section of the blocker (in particular, the aforementioned drive slope), via which the bolt may drive the blocker to move into the release position as a result of its insertion into the lock body.

In some embodiments, the bolt may have an engaging recess in which the latch engages in the locking position. In particular, the engaging recess may be configured as a circumferential groove. The bolt may have a substantially cylindrical insert section that is inserted into the lock body. In some embodiments, the bolt may have an insert incline and/or a drive incline at its free end, in particular in the shape of a conical or frustoconical tip. The drive incline of the bolt may cooperate with the latch and/or with the blocker in order to push back the latch or the blocker as a result of inserting the bolt into the lock body.

The invention also relates to a frame lock of a two-wheeler or for a two-wheeler, wherein the frame lock comprises a bolt lock of the aforementioned type as well as a shackel (in particular, a linear shackel) which is configured to pass through a spoked wheel of the two-wheeler in a closed state, wherein a free end of the shackle comprises the aforementioned bolt. For this purpose, the lock body may be mounted to a frame section of the two-wheeler or integrated into a frame section of the two-wheeler (whereby the frame section may form a housing of the lock body). The shackle may be inserted along a linear insertion direction into an insert opening of the lock body that points in the direction of the spoked wheel. In this closed state, the end of the shackle (bolt) may be locked to the lock body. Hereby the spoked wheel is blocked from rotating and the associated key may be removed from the lock cylinder, as explained. If the shackle is subsequently unlocked by actuating the lock cylinder accordingly, the shackle may be removed from the lock body and from the movement path of the spoked wheel. In this open state, the two-wheeler is released for riding, whereby the key is secured at the lock body. In the open state, the shackle may be permanently connected to or completely separated from the lock body.

DRAWINGS

The invention is explained below merely by way of example with reference to the drawings.

DESCRIPTION OF THE INVENTION

Figure 1:
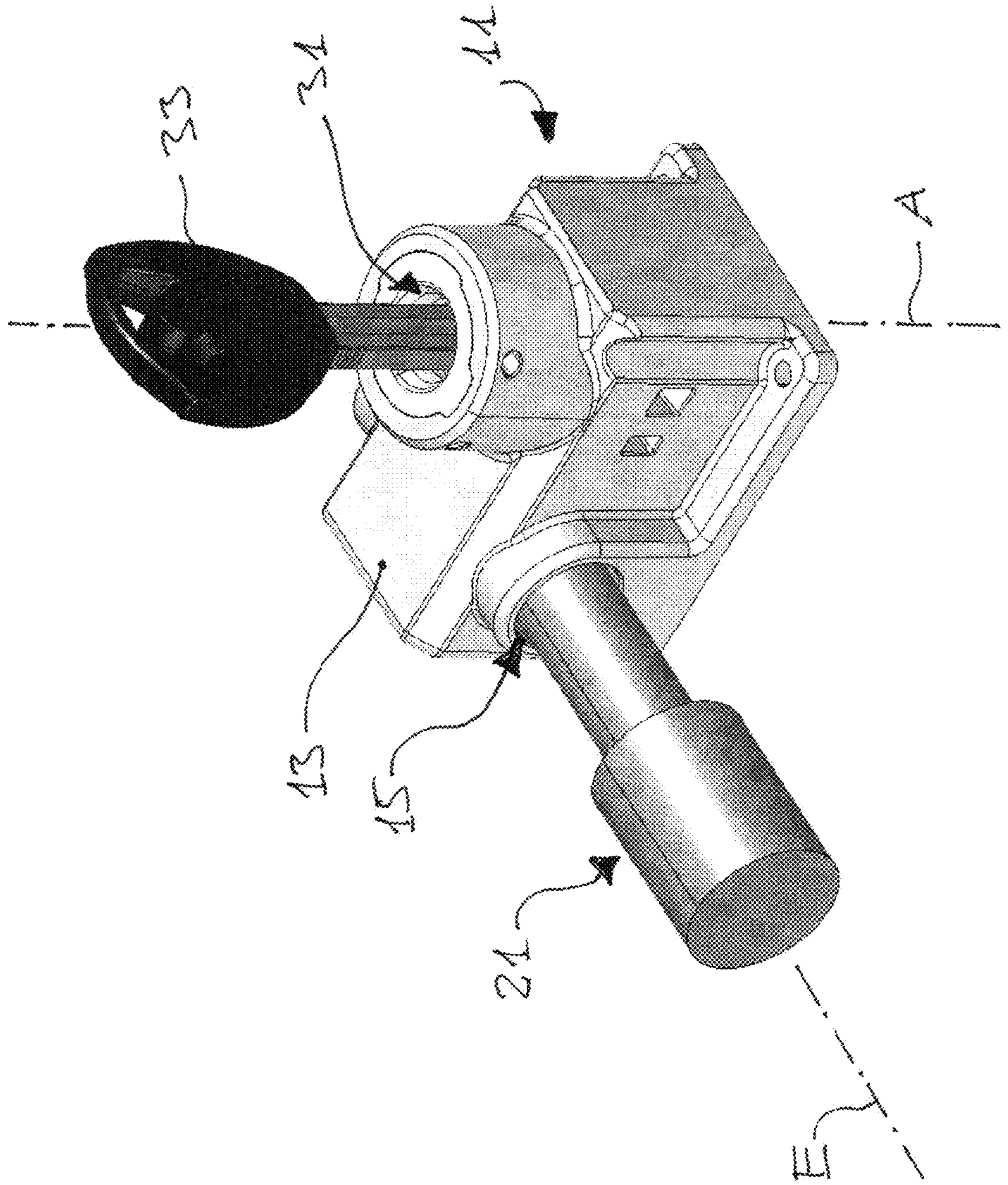
FIG. 1 shows a perspective view of the bolt lock.

The figures show a possible embodiment of a bolt lock comprising a lock body 11 and a bolt 21 which can be selectively inserted into the lock body 11 along a bolt insertion direction E and locked at the lock body 11 (FIG. 1). The lock body 11 comprises a housing 13 with an insert opening 15 for the bolt 21.

Figure 2:
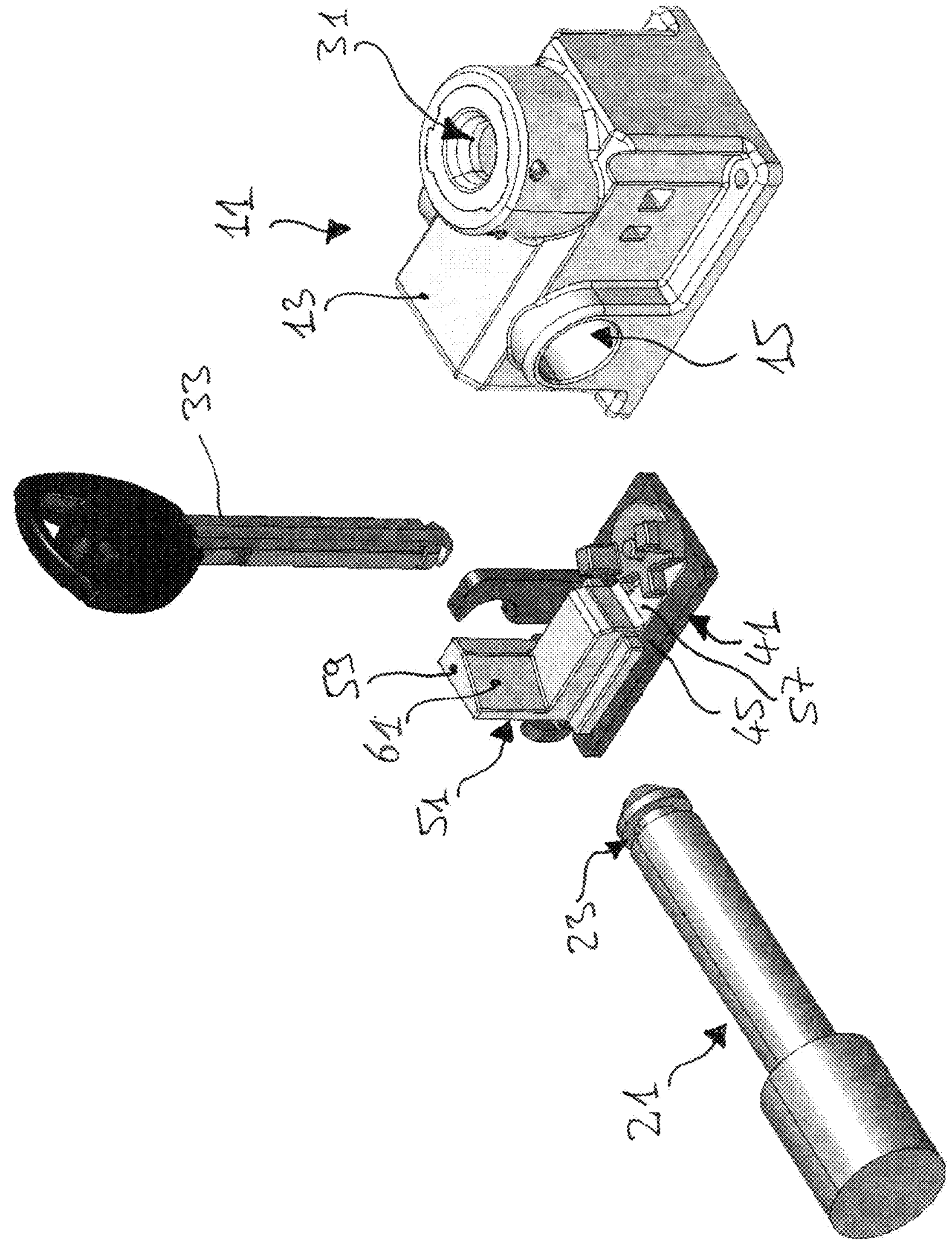
FIG. 2 shows an exploded view of the bolt lock from above.
Figure 4A:
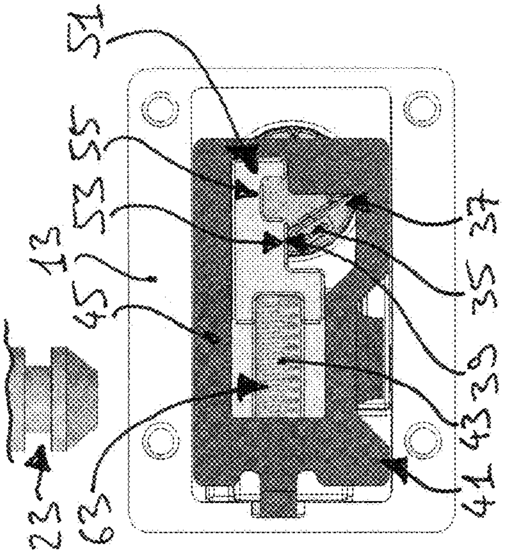
FIGS. 4A to 4C show the bolt lock with the bolt not or not completely inserted, namely, (A) in a bottom view, (B) in a partially cut-away perspective view from above and (C) in a perspective view from above.
Figure 5A:
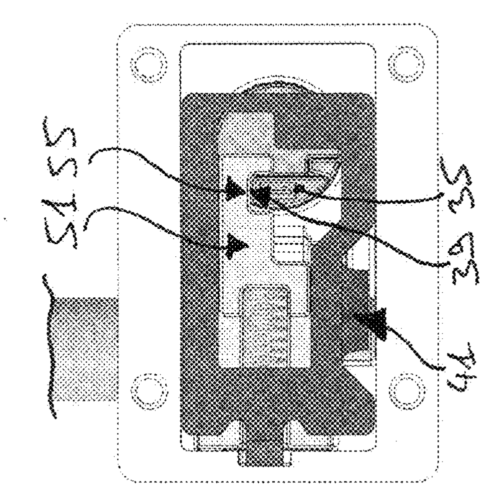
FIGS. 5A to 5C show the bolt lock with the bolt inserted and locked in the three viewpoints shown in FIG. 4.

Within the housing 13, the lock body 11 comprises a lock cylinder 31 (not shown separately) that can be actuated between an initial position (FIG. 1) and an actuating position (FIG. 6C) by means of an associated key 33 which is turned about a lock cylinder axis A; a latch 41 (FIGS. 2 and 3) which is movable between a locking position (FIG. 5A) and an unlocked position (FIG. 6A); and a blocker 51 (FIGS. 2 and 3) which is movable between a blocking position (FIG. 4A) and a release position (FIG. 5A).

The key 33 can be inserted into the lock cylinder 31 along the lock cylinder axis A, whereby the lock cylinder axis A is oriented perpendicular to the bolt insertion direction E. The lock cylinder 31 is configured to release the inserted key 33 for removal only when the lock cylinder 31 and thus the key 33 are in the initial position (FIG. 1, FIG. 5C).

Figure 3:
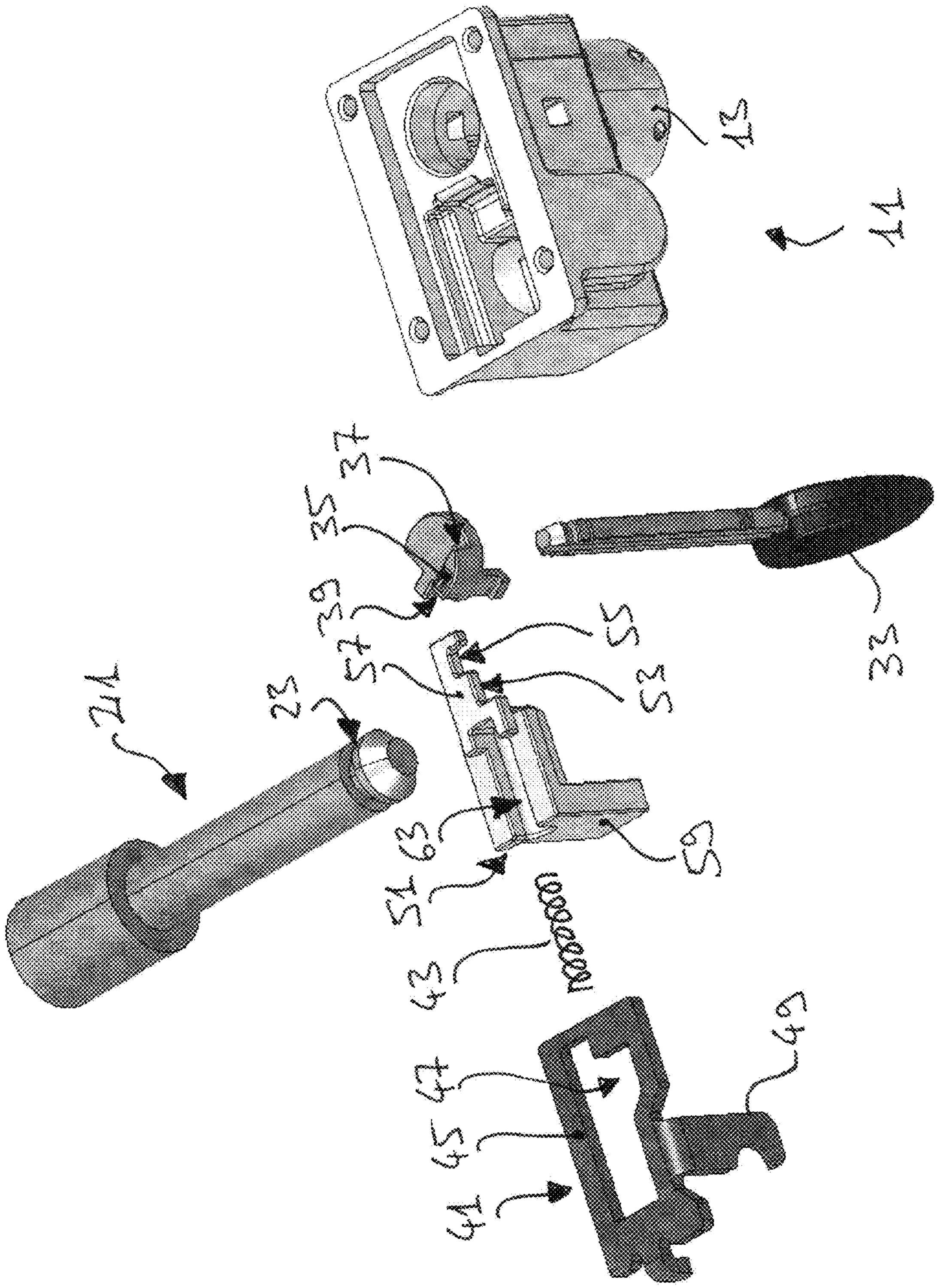
FIG. 3 shows an exploded view of the bolt lock from below.

The latch 41 and the blocker 51 are mounted to be movable in a straight line. The latch 41 and the blocker 51 are mounted in a floating manner and are pretensioned in directions opposite to one another by a common preload spring 43 (FIG. 3). The preload spring 43 is clamped between the latch 41 and the blocker 51.

The latch 41 has a flat bearing section 45 which extends along a plane perpendicular to the lock cylinder axis A and is movable perpendicular to the lock cylinder axis A. The bearing section 45 comprises a control opening 47. The blocker 51 also comprises a flat bearing section 57 which extends coplanar to the bearing section 45 of the latch 41 along a plane perpendicular to the lock cylinder axis A and is movable perpendicular to the lock cylinder axis A and parallel to the latch 41, wherein the bearing section 45 of the latch 41 and the bearing section 57 of the blocker 51 abut each other and thus form a rectilinear mutual guide. The latch 41 also comprises a locking section 49 which projects vertically from the bearing section 45 of the latch 41 and is configured to engage in a circumferential engaging recess 23 of the bolt 21 in the locking position. The blocker 51 comprises a drive section 59 which projects vertically from the bearing section 57 of the blocker 51. A drive slope 61 is formed at the drive section 59 of the blocker 51, via which the bolt 21 may push back the pretensioned blocker 51 as a result of its insertion into the lock body 11. Furthermore, the blocker 51 comprises an elongated semi-cylindrical recess 63 between the bearing section 57 and the drive section 59, in which the preload spring 43 is accommodated.

The lock cylinder 31 comprises a cam 35 which may be driven by a rotary actuation to a rotational movement about the lock cylinder axis A by means of the key 33 being inserted into the lock cylinder 31. For this purpose, the cam 35 is non-rotatably connected to the underside of a rotatable cylinder core (not shown) of the lock cylinder 31. The cam 35 has a substantially circular segment-shape and engages in the control opening 47 of the bearing section 45 of the latch 41. The cam 35 comprises a drive section 37 and a stop section 39. Depending on the position of the blocker 51, the stop section 39 of the cam 35 interacts with a blocking section 53 or a release section 55 of the blocker 51, as will be explained below.

The functioning of the bolt lock as shown is explained below with reference to FIGS. 4 to 7, whereby the three illustrations in the FIGS. 4 to 7 show respectively the bolt lock in a bottom view (A), in a partially cut-away perspective view from above (B), and in a perspective view from above (C).

Figure 4B:
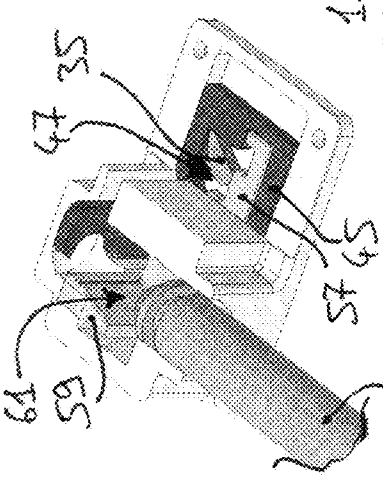
Figure 4C:
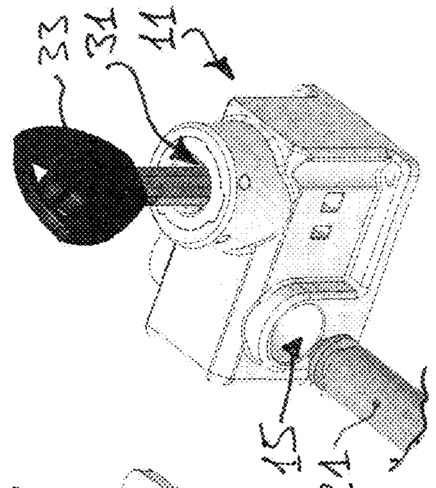

According to FIG. 4, the bolt 21 is not or not fully inserted into the lock body 11. The key 33 is in the lock cylinder 31 (FIG. 4C). The lock cylinder 31 is in an intermediate position between the initial position and the actuating position. The latch 41 and the blocker 51 protrude into the movement path of the bolt 21 within the housing 13 due to their respective pretension. As can be seen from FIGS. 4A and 4B, the stop section 39 of the cam 35 abuts the blocking section 53 of the blocker 51. Therefore, the blocker 51 is in the blocking position in which the blocker 51 blocks the lock cylinder 31 against an actuating movement into the initial position. As a result, it is prevented that the cam 35—and thus the key 33—is able to be turned into the initial position (FIG. 1). This rotary movement towards the initial position would take place clockwise in FIG. 4A and counterclockwise in FIG. 4C.

Figure 5B:
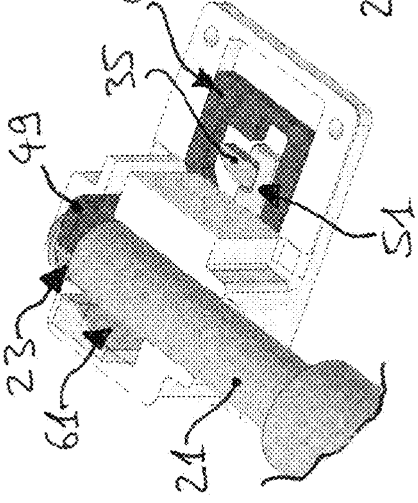
Figure 5C:
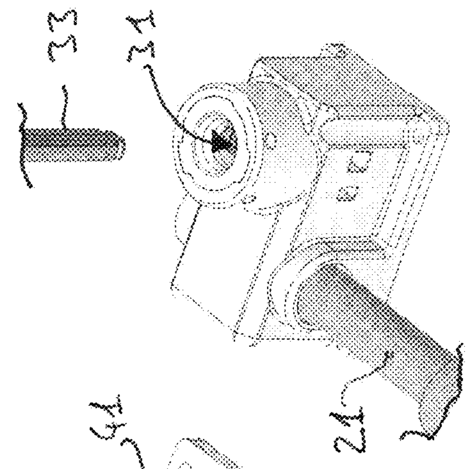

According to FIG. 5, the bolt 21 is fully inserted in the lock body 11 and locked in the lock body 11. For this purpose, the latch 41, after having been temporarily pushed back by the tip of the bolt 21 against the force of the preload spring 43, is in the locking position due to its pretension and engages with its locking section 49 in the engaging recess 23 of the bolt 21. By the bolt 21 being inserted into the lock body 11, the blocker 51 has been pushed back against the force of the preload spring 43 via its drive slope 61 into the release position and in this position the blocker 51 releases the lock cylinder 31 for an actuating movement into the initial position. For this purpose, the release section 55 of the blocker 51 is at the height of the cam 35 of the lock cylinder 31. Thus, the stop section 39 of the cam 35 may now be turned in the release section 55 of the blocker 51 by turning the key 33 to the initial position (FIG. 5A). In the initial position of the lock cylinder 31 thus reached, the key 33 may be removed from the lock cylinder 31 (FIG. 5C). The bolt 21 is now locked to the lock body 11.

Figure 6A:
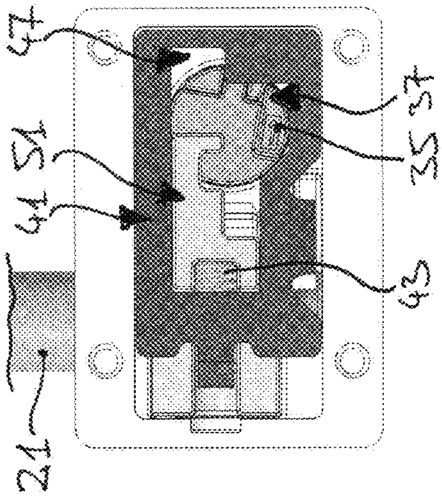
FIGS. 6A to 6C show the bolt lock with the bolt inserted and unlocked in the three viewpoints shown in FIG. 4.
Figure 6B:
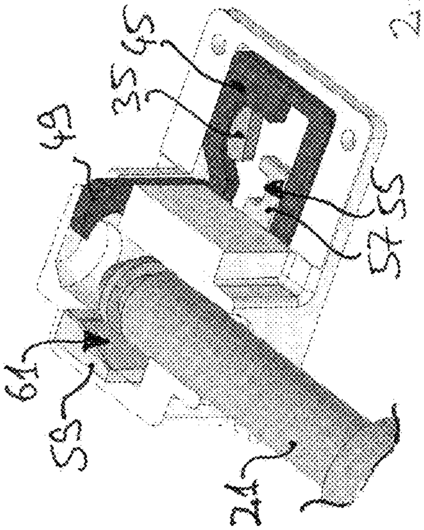
Figure 6C:
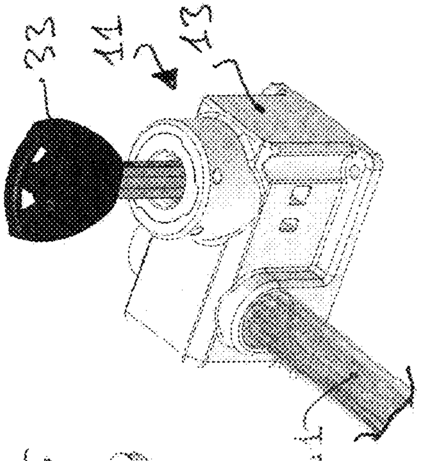

According to FIG. 6, the lock cylinder 31 is now in the actuating position. For this purpose, the key 33 was turned by approximately 90 degrees starting from FIG. 5, namely, counterclockwise in relation to the bottom view of FIG. 6A and clockwise in relation to the top view of FIG. 6C. This turning of the key 33 effects a corresponding rotation of the cam 35, so that the drive section 37 of the cam 35 drives the latch 41 towards its unlocked position (FIG. 6A). In the unlocked position, the latch 41 releases the bolt 21 for removal from the lock body 11.

Figure 7A:
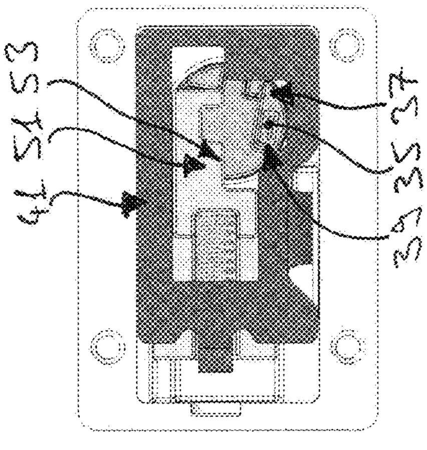
FIGS. 7A to 7C show the bolt lock with the bolt unlocked and removed in the three viewpoints shown in FIG. 4.
Figure 7B:
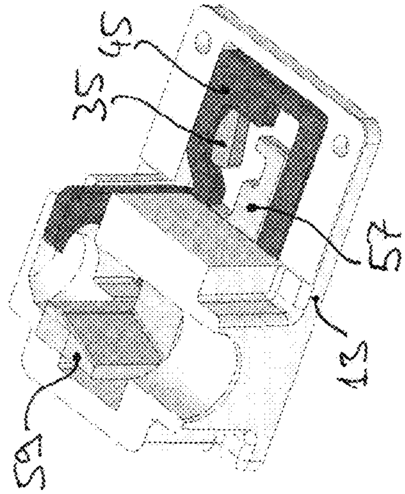
Figure 7C:
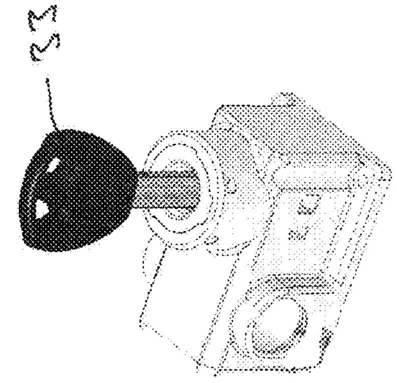

According to FIG. 7, the bolt is removed from the lock body 11. The key 33 is still in the actuating position. However, due to its pretension, the blocker 51 returns again to the blocking position (FIG. 7A). Starting from the actuating position, the key 33 may now be turned back towards the initial position. However, the lock cylinder 31 may not be moved completely to the initial position since the stop section 39 of the cam 35 ultimately abuts against the blocking section 53 of the blocker 51, as explained in relation to FIG. 4. The key 33 is therefore captured in the lock body 11.

As a result, the bolt lock shown has an automatic key securing function. The user may only remove the key 33 from the lock cylinder 31 and take it with him, when the bolt 21 is locked in the lock body 11.

It should also be noted with regard to the bolt lock shown in the Figures, that this lock may also be part of a frame lock of a two-wheeler or for a two-wheeler, whereby the frame lock has a straight or curved shackle whose end forms the bolt 21.

What is claimed is:

1. A bolt lock, having a lock body and a bolt which can be selectively inserted into the lock body and locked to the lock body;

wherein the lock body comprises a lock cylinder which can be actuated between an initial position and an actuating position by a rotary actuation about a lock cylinder axis using an associated key;

a latch which is movable between a locking position and an unlocked position; and a blocker which is movable between a blocking position and a release position;

wherein the latch locks the inserted bolt to the lock body in the locking position and releases the inserted bolt for removal from the lock body in the unlocked position;

wherein the latch can be moved to the unlocked position by actuating the lock cylinder to the actuating position;

wherein the key can only be removed from the lock cylinder in the initial position of the lock cylinder;

wherein the blocker blocks the lock cylinder against an actuating movement into the initial position in the blocking position, and releases the lock cylinder for an actuating movement into the initial position in the release position; and wherein the bolt inserted into the lock body moves the blocker into the release position.

2. The bolt lock according to claim 1, wherein the latch occupies the locking position when the lock cylinder is in the initial position.

3. The bolt lock according to claim 1, wherein the latch is pretensioned in the direction of the locking position.

4. The bolt lock according to claim 1, wherein the blocker occupies the blocking position when the bolt is removed from the lock body.

5. The bolt lock according to claim 1, wherein the blocker is pretensioned in the direction of the blocking position.

6. The bolt lock according to claim 1, wherein the latch and the blocker are floatingly mounted and are pretensioned by a common preload spring.

7. The bolt lock according to claim 1, wherein the lock cylinder comprises a rotatable cam.

8. The bolt lock according to claim 7, wherein the cam comprises a drive section which drives the latch towards the unlocked position when the lock cylinder is actuated to the actuating position.

9. The bolt lock according to claim 7, wherein the cam comprises a stop section which abuts the blocker when the blocker occupies the blocking position and the lock cylinder is being actuated from the actuating position towards the initial position.

10. The bolt lock according to claim 7, wherein the blocker comprises a blocking section and a release section, wherein in the blocking position of the blocker the blocking section blocks the cam of the lock cylinder against an actuating movement of the lock cylinder into the initial position, and wherein in the release position of the blocker the release section releases the cam of the lock cylinder for an actuating movement of the lock cylinder into the initial position.

11. The bolt lock according to claim 1, wherein the bolt is insertable into the lock body along a bolt insertion direction, wherein the key is insertable into the lock cylinder along the lock cylinder axis, and wherein the lock cylinder axis is oriented perpendicular to the bolt insertion direction.

12. The bolt lock according to claim 1, wherein the latch and the blocker are mounted to be movable rectilinearly.

13. The bolt lock according to claim 1, wherein the latch comprises a flat bearing section which extends along a plane perpendicular to the lock cylinder axis and is movable perpendicular to the lock cylinder axis, wherein the blocker comprises a flat bearing section which extends along a plane perpendicular to the lock cylinder axis and is movable perpendicular to the lock cylinder axis and parallel to the latch.

14. The bolt lock according to claim 13, wherein the bearing section of the latch and the bearing section of the blocker are arranged coplanar and abut against each other.

15. A frame lock of a two-wheeler or for a two-wheeler, wherein the frame lock comprises a bolt lock according to claim 1 and a shackle which is configured to pass through a spoked wheel of the two-wheeler in a closed state, wherein one end of the shackle comprises said bolt.

16. A bolt lock, having a lock body and a bolt which can be selectively inserted into the lock body and locked to the lock body;

wherein the lock body comprises a lock cylinder which can be actuated between an initial position and an actuating position by a rotary actuation about a lock cylinder axis using an associated key;

a latch which is movable between a locking position and an unlocked position; and a blocker which is movable between a blocking position and a release position;

wherein the latch locks the inserted bolt to the lock body in the locking position and only releases the inserted bolt for removal from the lock body in the unlocked position;

wherein the latch can be moved to the unlocked position only by actuating the lock cylinder into the actuating position;

wherein the blocker blocks the lock cylinder against an actuating movement into the initial position in the blocking position, and releases the lock cylinder for an actuating movement into the initial position in the release position;

wherein the blocker is spring-biased in the direction of the blocking position and assumes the blocking position when the bolt is removed from the lock body; and wherein the bolt moves the blocker into the release position when the bolt is inserted into the lock body.

17. The bolt lock according to claim 16, wherein the latch is spring-biased in the direction of the locking position; and wherein the latch and the blocker are spring-biased by a common preload spring.

* * * * *